E. C. GRIZZELL.
TRACTION GAS ENGINE GEARING.
APPLICATION FILED FEB. 12, 1910.
970,493.
Patented Sept. 20, 1910.
4 SHEETS—SHEET 4.
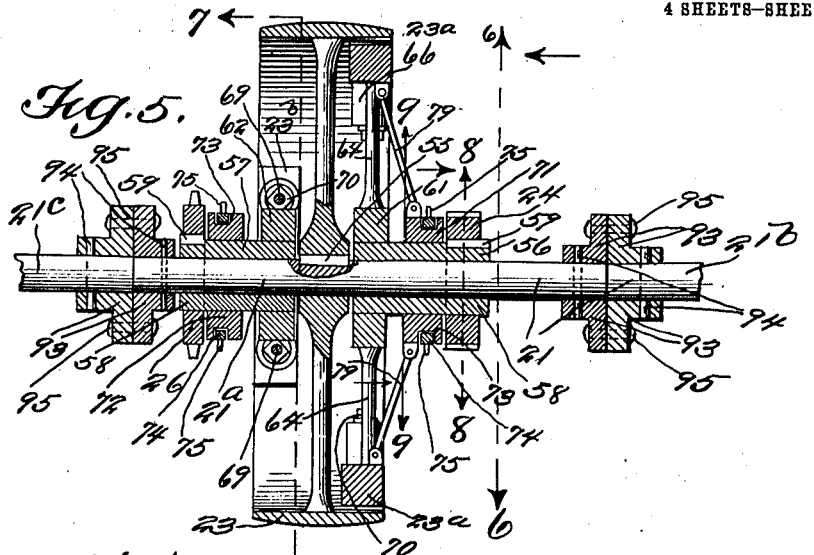
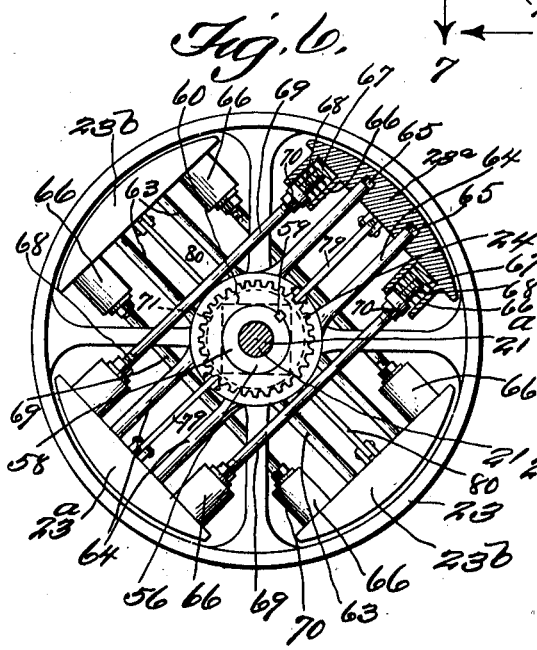
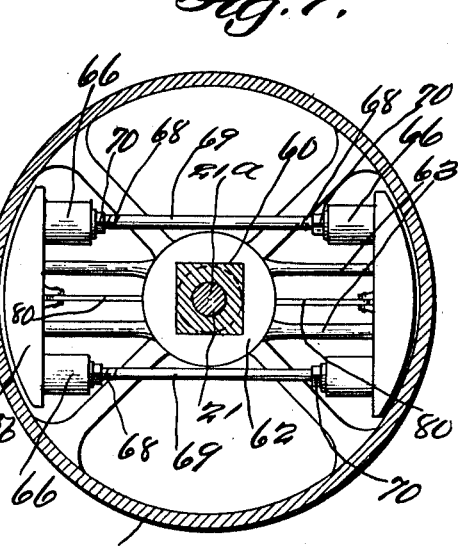
Witnesses
Francis G. Boswell.
M. M. Miller.
Inventor
E. C. Grizzell.
By D. Swift & Co.
Attorneys

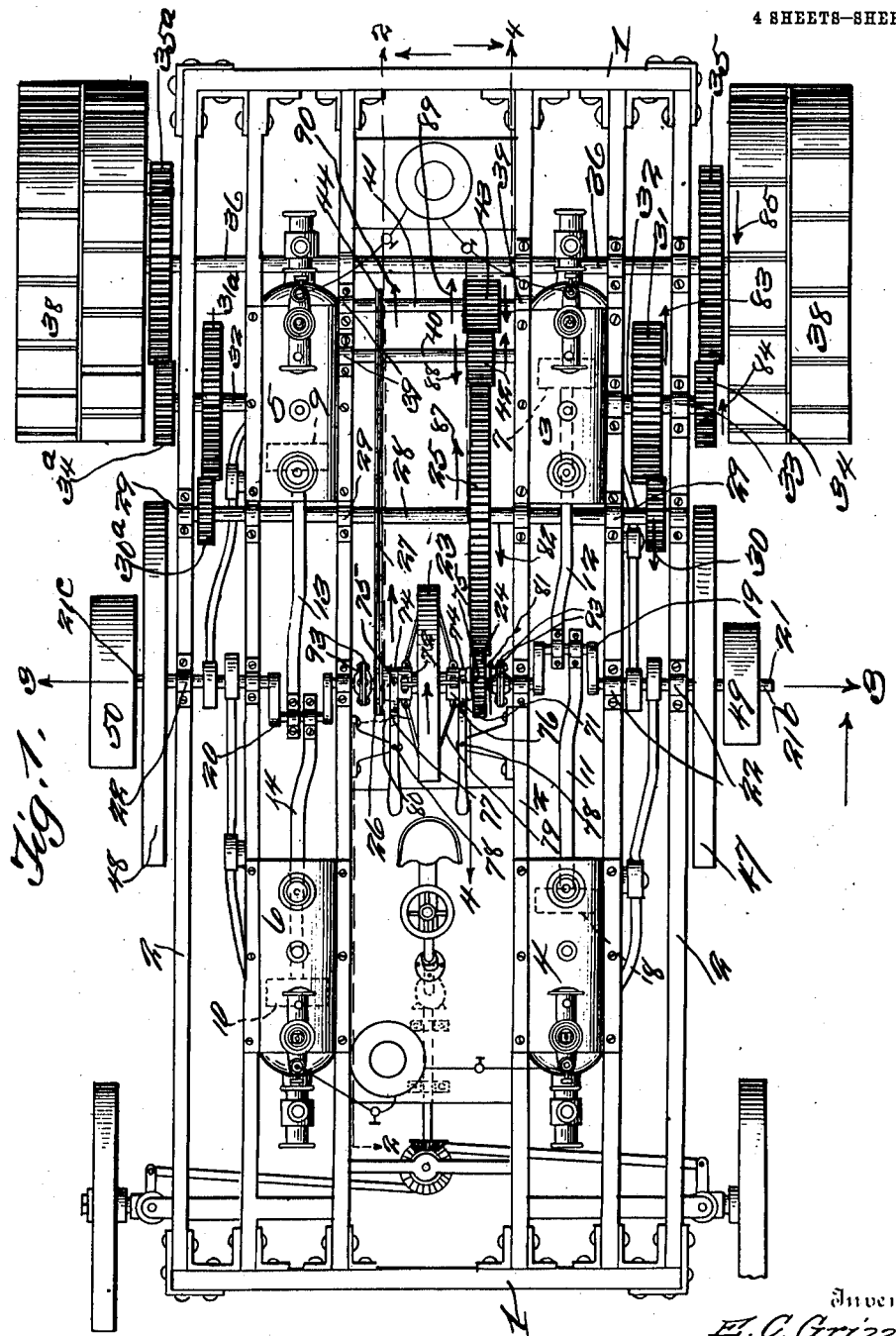

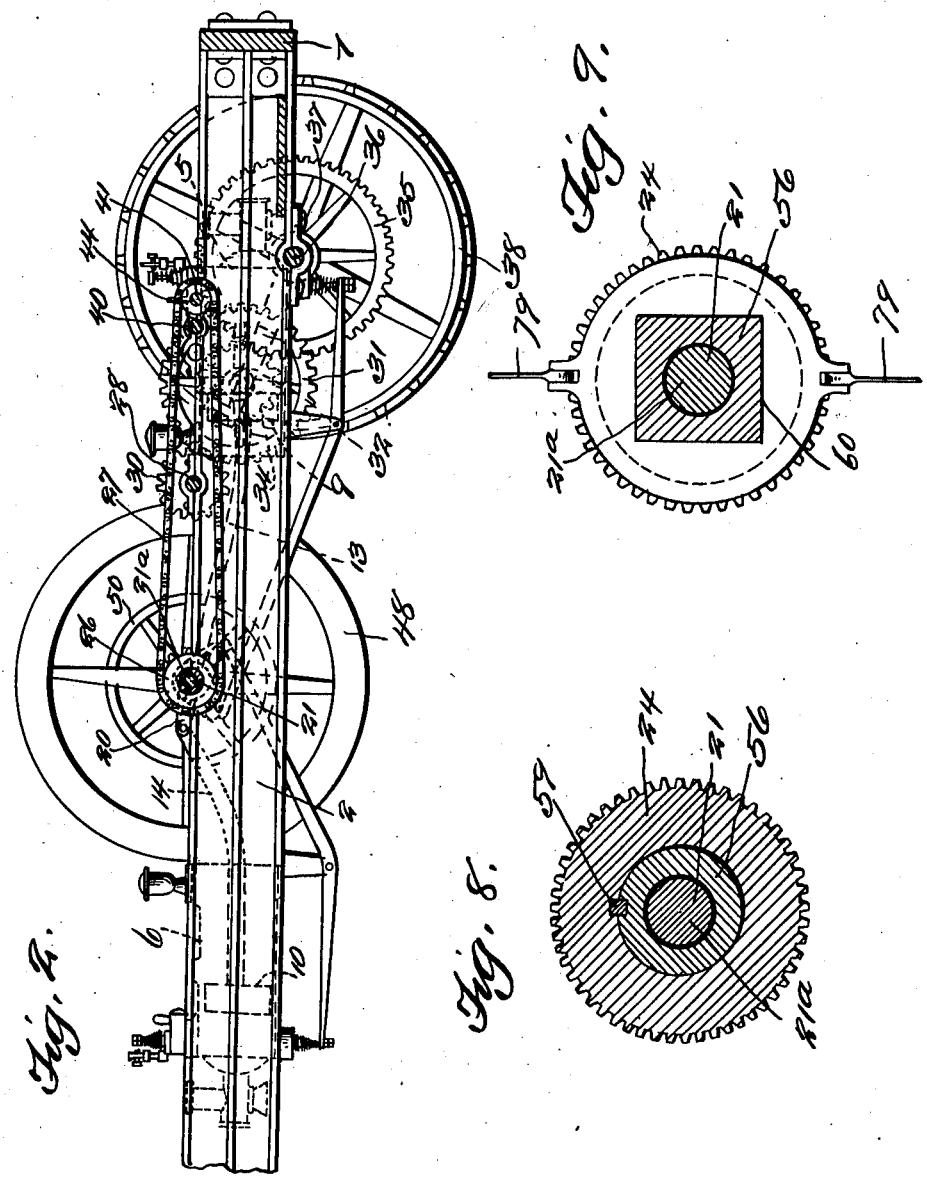

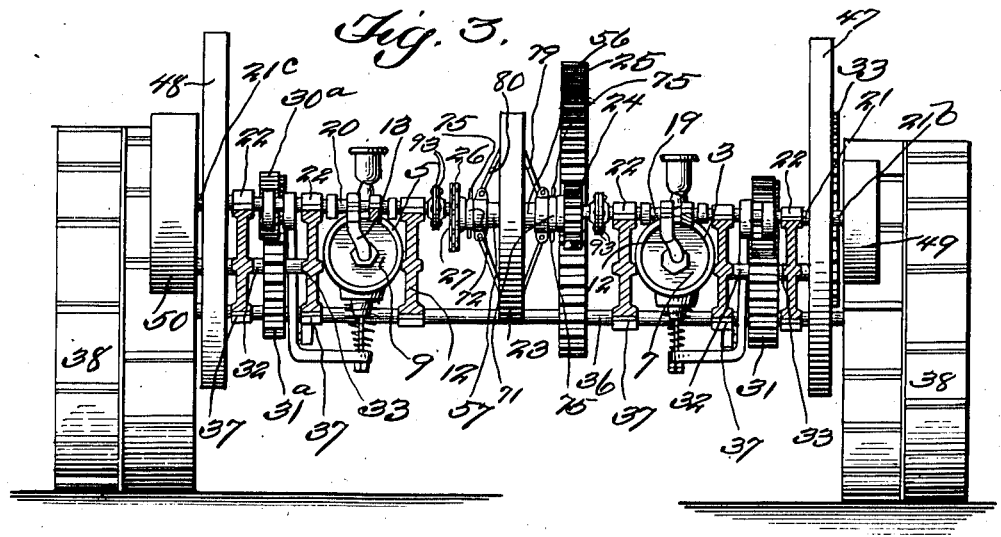
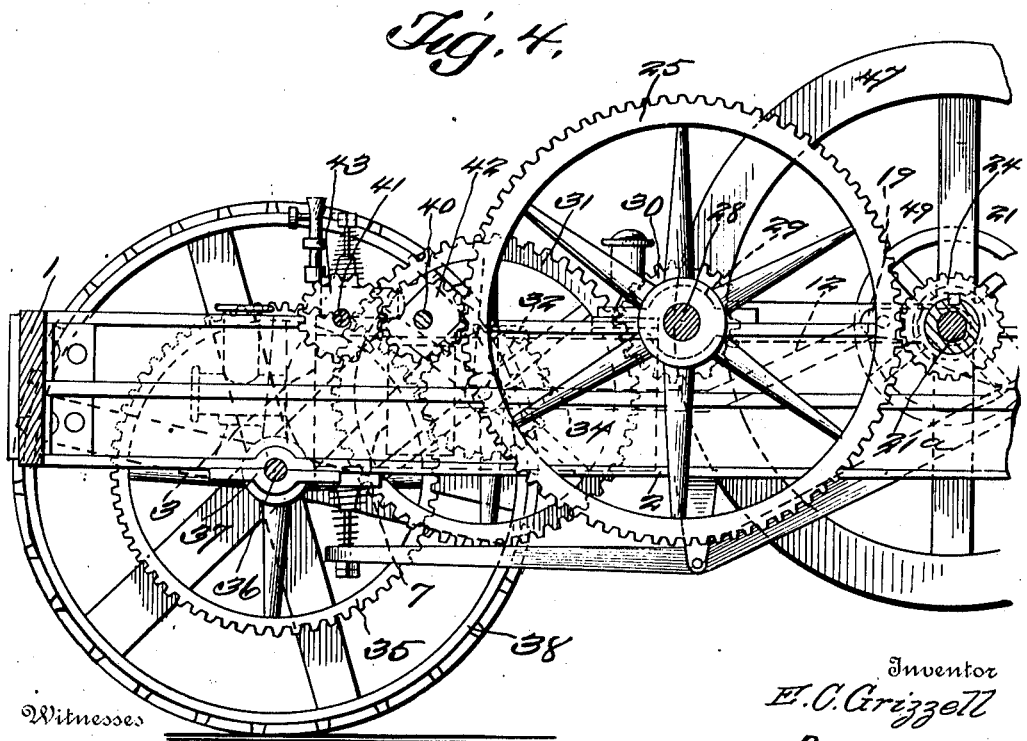

UNITED STATES PATENT OFFICE.

EMORY C. GRIZZELL, OF CLAFLIN, KANSAS.

TRACTION-GAS-ENGINE GEARING.

970,493.   Specification of Letters Patent.   Patented Sept. 20, 1910.

Application filed February 12, 1910. Serial No. 543,624.

*To all whom it may concern:*

Be it known that I, EMORY C. GRIZZELL, a citizen of the United States, residing at Claflin, in the county of Barton and State of Kansas, have invented a new and useful Traction-Gas-Engine Gearing; and I do hereby declare the following to be a full, clear, and exact description of the invention, such as will enable others skilled in the art to which it appertains to make and use the same.

This invention pertains to a new and useful traction gas engine gearing adapted for use in connection with threshing machines and the like.

The primary object of the invention is the production of a device of this design in which a new and novel gearing is employed comprising a multiple of gears so arranged with regard to the traction wheels, the driven crank shaft (which is driven by the pistons of the oppositely arranged engine cylinder) and the transmission friction clutch, in order that the various moving parts of the structure may easily operate and in unison, and furthermore, to allow the various parts to be easily and quickly reversed in their movements.

A further object of the invention is the provision of a transmission friction clutch, whereby a fan (not shown) for a radiator to a cooling system (not shown) may be driven through the medium of a belt connection (not shown), said transmission friction clutch being so constructed as to reverse the motion of the engine and its gearing thereof.

In this specification and the drawings annexed hereto, a particular design of device is adhered to, but the invention is not to be confined to this particular design.

The device, in its reduction to practice, may require changes and variations; the right thereto belongs to the applicant, provided such changes and variations are comprehended by the appended claims.

Further objects and combinations of parts will be hereinafter set forth and pointed out in the appended claims.

Figure 1, in the drawings, is a top plan view of a traction gas engine gearing, constructed in accordance with the invention. Fig. 2 is a sectional view on line 2—2 of Fig. 1, displaying various parts of the invention in side elevation. Fig. 3 is a transverse sectional view on line 3—3 of Fig. 1, showing the transmission friction clutch in elevation, the mounting of the crank shaft upon the bearing beams of the frame, and showing various other parts of the device in elevation. Fig. 4 is a sectional view on line 4—4 of Fig. 1, looking in the direction of the arrow. Fig. 5 is an enlarged detail sectional view of the transmission friction clutch. Fig. 6 is a sectional view upon line 6—6 of Fig. 5, looking in the direction of the arrow and showing the clutch wheel and the clutches in side elevation, there being one of the clutch members shown in section. Fig. 7 is a sectional view on line 7—7 of Fig. 5, showing one of the clutches in elevation, and further displaying how a portion of the clutch member is fixed to rotate with a rectangular shaped sleeve (which is mounted on a cylindrical shaft). Fig. 8 is a sectional view on line 8—8 of Fig. 5, showing how the gear 24 is keyed to rotate with a cylindrical portion of another sleeve (which is mounted upon the section 21$^a$ of the shaft 21) so the section 21$^a$ of the shaft 21 will rotate freely when the clutch members are not frictionally engaging the clutch wheel. Fig. 9 is a sectional view upon line 9—9 of Fig. 5, illustrating the manner of mounting the slidable clutch hub upon a rectangular portion of the sleeve shown in Fig. 8.

Referring to the drawings, 1 designates a frame-work of the traction engine upon which a plurality of bearing beams 2 are supported, which bearing beams form a bed base for the support of the driven crank shaft and various other shafts of the multiple of gears.

3, 4, 5 and 6 designate engine cylinders in which the combustion takes place, in the usual manner, in order to operate the pistons 7, 8, 9 and 10. These pistons are provided with pitman rods 11, 12, 13 and 14, which are connected to the cranks 19 and 20 of the crank shaft 21 (which is mounted in suitable bearings 22 of the bearing beams 2).

Mounted upon the crank shaft 21 is a transmission friction clutch wheel 23, which is adapted to transmit power to a fan (not shown) of a radiator to a cooling system (not shown). The clutches or members 23$^a$ and 23$^b$ of the clutch wheel may be thrown in and out of contact with the wheel 23 in order to reverse the motion of the gearing, the operations of said clutches or members will be hereinafter more fully set forth.

Mounted upon the crank shaft 21 adjacent the transmission friction wheel is a pinion or gear 24 (which meshes with a spur gear 25.) Mounted upon the shaft 21 and also adjacent the transmission friction clutch is a sprocket wheel 26, about which a sprocket chain 27 travels.

The spur gear 25 is journaled upon and adapted to rotate with a shaft 28 (which is journaled in suitable bearings 29 of the bearing beams.) Upon the ends of the shaft 28 are pinions or gears 30 (which mesh with spur gears 31.) These spur gears 31 are smaller in diameter than the spur gear 25 and are mounted upon shafts 32, which shafts 32 are journaled in suitable bearings 33 of the bearing beams, as shown clearly in Fig. 1.

Upon the outer ends of the shafts 32 are pinions or gears 34 and 34ª (which mesh with the spur gears 35 and 35ª.) The spur gears 35 and 35ª are mounted upon the shaft 36 (which is journaled in suitable bearings 37 on the lower portion of the frame 1.)

38 denotes traction wheels of the usual structure which are journaled upon and designed to rotate with the shaft 36, and when power is transmitted to the shaft 36 through the multiple of gears, the traction wheels 38 will rotate, thereby propelling the engine in a forward or rearward direction.

Journaled in suitable bearings 39 upon two central bearing beams are shafts 40 and 41 (which are geared together by two pinions 42 and 43.) The said pinion or gear 42 meshes with the spur gear 25. Journaled upon and designed to rotate with the shaft 41 is a sprocket 44 (about which the sprocket chain 27 travels.)

The crank shaft 21 is constructed in 3 sections 21ª, 21ᵇ and 21ᶜ, and the sprocket wheel 26 and gear 24 are carried by the section 21ª, the purpose of which structure will be hereinafter set forth.

The sections 21ᶜ and 21ᵇ are provided with fly wheels 47 and 48 and pulleys 49 and 50, to which belts may be connected, in order to operate the usual form of threshing machine (not shown.)

The friction clutch wheel 23 is keyed, as shown at 55, to the section 21ª of the shaft 21, in order to rotate therewith. Loosely journaled upon the section 21ª of the shaft 21 are sleeves 56 and 57, the end portions 58 of which are cylindrical, as shown clearly in Fig. 6, and to these end portions the pinion 24 and sprocket wheel 26 are keyed, by means of the feathers 59. It will be observed that the wheel 24 and sprocket wheel 26 will rotate with the said sleeves. The remaining portions of the sleeves 56 and 57 are rectangular in cross section, as will be clearly seen at 60 in Figs. 6 and 7, as well as in Fig. 9. Mounted upon the rectangular portions of said sleeves are clutch hub members 61 and 62, from which spokes or rods 63 and 64 project at right angles to one another. The clutch members or shoes 23ª and 23ᵇ are mounted upon the ends of these rods or spokes to slide outwardly, as shown clearly at 65 in Fig. 6, in order to be thrown in contact with the clutch wheel 23. The clutch members or shoes are provided with integral shells 66, in which springs 67, as shown in Fig. 6, are mounted. Passing through the springs are the threaded ends 68 of the rods 69, and threaded upon the rods 69 are nuts or members 70, between which and the clutch members or shoes the said springs are interposed. By adjusting these nuts toward the springs, it will be clearly seen that the tendency of the clutch members or shoes is to engage the clutch wheel. Also, mounted upon the rectangular portions of the sleeves 56 and 57 are slidable clutch hubs 71 and 72, which are provided with annular grooves 73 for the reception of the collars 74.

Projecting from the collars 74 are pins 75, with which the forked ends of the levers 76 and 77 engage. These levers 76 and 77 are pivoted at 78 to the frame-work of the machine, and by oscillating the levers, the slidable clutch hubs may be moved toward or away from the clutch wheel.

Connecting the slidable clutch hubs and the clutch members or shoes are rods 79 and 80, and through these connecting rods, the clutch members or shoes may be thrown in engagement with the clutch wheel, when the slidable clutch hubs are moved toward the clutch wheel. When the slidable clutch hubs are moved away from the clutch wheel, the clutch members or shoes are drawn inwardly and toward the crank shaft, against the tension of the springs 67. When operating the clutch members or shoes, so as to contact with the clutch wheel, they are assisted by the expansion of the springs 67.

When it is desired to traverse the machine forward, the lever adjacent the pinion 24 is operated, so that the clutch members or shoes 23ª are thrown in engagement with the clutch wheel. In this case the gear 24 is rotated in the direction of the arrow 81, which in turn rotates the spur gear 25 in the opposite direction, as indicated by the arrow 82. By rotating the gear 25 and the shaft 28 in this direction, the gear 30 is rotated in the same direction, consequently the gear 31 is revolved in the opposite direction, the arrow 83 indicating its direction. The gear 34 is rotated in the same direction as the gear 31, therefore the gear 35 is rotated in the opposite direction, which direction is shown by the arrow 85. When the gears, the motions of which have just been set forth, are operated in this manner, the sprocket wheel 26 is rotated idly, as well as the clutch members or shoes 23ᵇ, but the gears 30ᵃ, 31ᵃ, 34ᵃ and 35ᵃ are rotated in the same direction as the gears 30, 31, 34 and 35. To reverse the machine, the lever 77 adjacent the sprocket wheel 26 is operated, so as to draw the clutch members or shoes 23ᵇ in engagement with the clutch wheel 23, and by so doing the directions of the rotation of the pinions 42 and 43, and the spur gear 25, as well as the sprocket wheel 44, are changed, as indicated by the arrows 87, 88, 89 and 90. By changing the direction of rotation of the gear 25, it will be observed that the direction of rotation of the gears 30, 30ᵃ, 31, 31ᵃ, 34, 34ᵃ, 35 and 35ᵃ are changed. From the above, it will be observed that by throwing the clutch members 23ᵇ in engagement with the clutch wheel, that the machine will be driven rearwardly.

The sections 21ᵃ, 21ᵇ and 21ᶜ are coupled together, shown more clearly in Fig. 5, by means of collars 93. Penetrating the flanges of the collars are bolts 95 to hold them securely in place. These collars are secured to the sections of the shaft 21, by means of pins 94, in order that the sections of the shaft 21 may rotate as one body.

Having thus fully set forth the invention, what is claimed as new and useful is:—

1. In a traction engine; the combination of a frame-work, comprising two parallel beams equally spaced apart upon each side thereof, and two intermediate parallel beams, and a rear shaft extending transversely of each beam having traction wheels thereon and provided with gears; of a driven crank shaft having a pinion and sprocket wheel; a forward shaft mounted in bearings of each beam, positioned adjacent the crank shaft and provided with an intermediate gear, meshing with the pinion of the crank shaft and a pinion at either end; said first named parallel beams having short shafts mounted in bearings thereof; said short shafts having gears meshing with the gears and the pinions of the rear and forward shafts; short shafts mounted in bearings of the intermediate beams having inter-meshing pinions, one being in gear with the intermediate gear, one of said last named short shafts having a sprocket provided with an endless connection with the sprocket of the crank shaft.

2. In a traction engine; the combination of a frame-work comprising two parallel beams equally spaced apart upon each side thereof, and two intermediate parallel beams, and a rear shaft extending transversely of each beam having traction wheels thereon and provided with gears; of a crank shaft having a pinion and sprocket wheel; a forward shaft mounted in bearings of each beam, positioned adjacent the crank shaft and provided with an intermediate gear, meshing with the pinion of the crank shaft and a pinion at either end; said first named parallel beams having short shafts mounted in bearings thereof; said short shaft having gears meshing with the gears and the pinions of the rear and forward shafts; short shafts mounted in bearings of the intermediate beams having inter-meshing pinions, one being in gear with the intermediate gear, one of said last named short shafts having a sprocket provided with an endless connection with the sprocket of the crank shaft; and a pair of engines located upon either side of the crank shaft having connections therewith for driving the crank shaft.

3. In a traction engine; the combination of a frame-work, comprising two parallel beams equally spaced apart upon each side thereof, and two intermediate parallel beams, and a rear shaft extending transversely of each beam having traction wheels thereon and provided with gears; of a crank shaft having a clutch wheel and provided with a pinion and sprocket wheel; a forward shaft mounted in bearings of each beam, positioned adjacent the crank shaft and provided with an intermediate gear, meshing with the pinion of the crank shaft and a pinion at either end; said first named parallel beams having short shafts mounted in bearings thereof; said short shafts having gears meshing with the gears and the pinions of the rear and forward shafts; short shafts mounted in bearings of the intermediate beams having inter-meshing pinions, one being in gear with the intermediate gear, one of said last named short shafts having a sprocket provided with an endless connection with the sprocket of the crank shaft; means for driving the crank shaft; and means carried by the crank shaft to coöperate with the clutch wheel whereby the traction wheels may be reversed in motion.

In testimony whereof I have signed my name to this specification in the presence of two subscribing witnesses.

EMORY C. GRIZZELL.

Witnesses:
R. L. HAMILTON,
H. M. STARR.